United States Patent Office 3,399,109
Patented Aug. 27, 1968

3,399,109
EPOXY MODIFIED VINYL COPOLYMERS OF
α,β - UNSATURATED DICARBOXYLIC ACID
PARTIAL ESTERS
Robert L. Zimmerman and Lieng-Huang Lee, Midland, Mich., assignors to The Dow Chemical Company, Midland, Mich., a corporation of Delaware
No Drawing. Continuation-in-part of application Ser. No. 97,731, Mar. 23, 1961. This application Aug. 19, 1966, Ser. No. 573,498
8 Claims. (Cl. 161—184)

ABSTRACT OF THE DISCLOSURE

This application relates to epoxy compositions containing homogeneous copolymers of vinyl aromatic compounds and α,β-unsaturated dicarboxylic acid partial esters which are useful as coatings having excellent stain, detergent and solvent resistance.

---

This application is a continuation-in-part of copending application Ser. No. 97,731, filed Mar. 23, 1961.

We have found that hard, tough, glossy, transparent and adherent continuous coatings and laminates having excellent stain, detergent and solvent resistance are obtained from compositions comprising (A) a homogeneous copolymer of (1) from 67 to 98, preferably 80 to 96, mole percent of a monoalkenyl aromatic compound and (2) correspondingly, from 33 to 2, preferably 20 to 4 mole percent, of an α,β-unsaturated dicarboxylic acid anhydride which is mono-esterified from 50 to 120 mole percent with an alkylene oxide mono ether primary or secondary alcohol having the general formula:

$$R(OC_nH_{2n})_mOH$$

wherein $n$ equals an integer from 2 to 6 inclusive, $m$ equals 1 or 2, and R represents alkyl radicals containing from 1 to 8 carbon atoms, cycloalkyl, mononuclear aromatic radicals, $C_1$ to $C_8$ substituted aromatic radicals such as di-secondary butylphenyl, benzyl, phenylethyl, tolyl and the like or a $C_3$ to $C_4$ unsaturated aliphatic alcohol wherein the —C=C— is removed at least 1 carbon from the OH, and (B) an epoxide having an epoxide equivalent weight of from 44 to 1000, preferably from 70 to 700, in a ratio to the monoalkenyl aromatic copolymer such that the epoxide to anhydride, including COOH, ratio is from 0.2 to 2.5, preferably from 0.5 to 2.0. It is preferred that the thermosetting composition contain at least 50 parts by weight of the monoalkenyl aromatic copolymer which preferably contains at least 50 weight percent of the monoalkenyl aromatic monomer. The monoalkenyl aromatic monomer should have a molecular weight characterized by 10% solution viscosity in MEK at 25° C. of 0.5 to 20 cps., preferably 0.9 to 10 cps.

In comparison with primary and secondary hydrocarbon alcohols, particularly the alkyl alcohols, the glycol mono ethers employed as the partial esters in solvent-borne coatings and laminating compositions of the present invention provide lower viscosity solutions for comparable molecular weight copolymers and also improve flowout and wetting characteristics especially when applied to metal substrates. It is possible, however, to realize similar benefits although in decreasing degree from mixtures of acid maleates of such hydrocarbon and ether-containing alcohols.

Monoalkenyl aromatic compounds which are suitable include, for example, styrene, vinyl toluene, t-butyl styrene, mono- and dichlorostyrene, α-methyl styrene, mixtures thereof and the like.

α,β-unsaturated dicarboxylic anhydrides which are suitable include, for example, maleic anhydride, chloromaleic anhydride, citraconic anhydride, itaconic anhydride, aconitic anhydride and the like.

Highly useful products are obtained employing an esterification of from about 50 to about 120 mole percent, where 100 mole percent represents the mono ester, and 200 mole percent would represent the diester.

Ether alcohols which may be employed include 2-methoxy ethanol; 2-ethoxy ethanol; 2-butoxy ethanol; diethylene glycol methyl, ethyl, propyl and butyl ethers; propylene glycol methyl ether; dipropylene glycol methyl ether and the like. The molecular weight of such ether alcohols is less than 250, preferably less than 200.

Partal esters of unsaturated dicarboxylic acids may be made in any convenient manner. Advantageously, the desired amount of the alkylene oxide ether alcohol is reacted with maleic anhydride at about 60° C. until a constant refractive index and density is obtained.

The homogeneous half ester copolymers useful in the present inventon may be prepared by a process which comprises the linear addition of from 90 to 65, preferably 85 to 70 weight percent of a mixture of the partially esterified maleic acid and polymerization catalyst, with or without the presence of a solvent therefor, to a solution of the vinyl aromatic monomer and from 10 to 35, preferably 15 to 30 weight percent of the partially esterified maleic acid and catalyst in a solvent therefor at a temperature of from 90° to 200° C., preferably 120 to 150° C. at a rate such that the addition is completed when the polymerization has reached 70 to 85 percent conversion of all monomers to copolymeric product. The polymerization may then be completed in the same temperature range. It is desirable that at least 10 weight percent of the half ester be admixed with the monoalkenyl aromatic monomer prior to the start of polymerization.

These products may also be prepared in a continuous process such as that illustrated in U.S. Patent 2,769,804 or copending application S.N. 33,376, filed June 2, 1960, now U.S. Patent 3,336,267, wherein the monomer may consist of the monoalkenyl aromatic compound and the desired half ester of maleic anhydride or the monoalkenyl aromatic compound and maleic anhydride, which copolymer is thereafter partially esterified in a conventional manner.

If prepared in accordance with continuous method employing acid maleate monomer feed, the product which has reached 60 to 70% conversion may be removed from the polymerizer and the polymerization thereafter completed to produce a clear, essentially homogeneous product.

By "homogeneous copolymer" is meant that at least 90 percent of the copolymer must have an anhydride component composition within a range of 5 percent, and preferably within a range of 2 percent by fractionation analysis. For example, a copolymer prepared by the method of Ser. No. 33,376 filed June 2, 1960 and containing 5.89 weight percent maleic anhydride and having a viscosity of 1.27 cps. with 0.6 percent volatiles, was fractionated by fractional precipitation of a 50 g. sample in 260 g. of toluene with Skellysolve, B.P. 96–99° C.

| Fraction | cc. Skellysolve | Wt., g. | Wt. Percent MA |
|---|---|---|---|
| 1 | 275 | 14.56 | 5.87 |
| 2 | 25 | 14.57 | 5.52 |
| 3 | 50 | 9.82 | 4.72 |
| 4 | 150 | 3.61 | 4.14 |
| 5 | 500 | 2.32 | 3.22 |
| 6 | Residue | 2.37 | 8.92 |
| | | 47.25 | |

A second 50 g. sample having a viscosity of 1.42 cps. and 2.1 percent volatiles, prepared as above but containing 10.25 weight percent maleic anhydride, and fractionated in the same manner, had the following distribution:

| Fraction | cc. Skellysolve | Wt., g. | Wt. Percent MA |
|---|---|---|---|
| 1 | 175 | 10.90 | 12.0 |
| 2 | 25 | 16.65 | 10.9 |
| 3 | 50 | 10.62 | 10.1 |
| 4 | 150 | 5.80 | 8.75 |
| 5 | 500 | 1.34 | 7.71 |
| 6 | Residue | 1.98 | 16.6 |
|  |  | 47.29 |  |

The high uniformity of these polymers is shown by the fact that better than 95 percent of the polymers have MA contents which fall within a 5 percent by weight range. An unfractionated portion of the latter samples, ⅛″ thick specimen, transmitted 87 percent of white light.

The half ester containing copolymers may be converted to half ester and anhydride containing terpolymers by devolatilizing at temperatures between about 150° and 300° C.

While the invention is applicable to epoxides generally, preferred polyepoxides are glycidyl polyethers of aromatic polyhydric compounds having weights per epoxide group of about 110 to about 700. Glycidyl ethers of polyhydric alcohols are also well known. These polyepoxides are made by reacting at least about two moles of an epihalohydrin with one mole of a polyhydric alcohol such as ethylene glycol, pentaerythritol, etc., followed by dehydrohalogenation according to U.S. Patent 2,581,464.

In addition to polyepoxides made from alcohols or phenols and an epihalohydrin, polyepoxides made by the known peracid method are also suitable. Epoxides of unsaturated esters, polyesters, diolefins, and the like can be prepared by reacting the unsaturated compound with a peracid. The reaction is one of epoxidation of compounds, with isolated double bonds, at a temperature sufficiently low so that the acid resulting from the peracid, for example, acetic acid in the case of peracetic acid, does not react with the resulting epoxide group to form hydroxyl groups and ester linkages. Preparation of polyepoxides by the peracid method is described in various periodicals and patents and such compounds as butadiene, polybutadiene, ethyl linoleate, as well as di- or tri-unsaturated drying oils or drying oil acids, esters and polyesters can all be converted to polyepoxides.

Epoxidized drying oils are also well known, these polyepoxides usually being prepared by reaction of a peracid such as peracetic acid or performic acid with the unsaturated drying oil according to U.S. Patent 2,569,502.

Desirable esters for epoxidation are prepared by reacting unsautrated aldehydes with butadiene to form unsaturated cyclic aldehydes. These can be condensed by Tischenko reaction to form esters or reduced to form alcohols which can be subsequently reacted with acids to form esters.

In addition to epoxidized drying oils, butadiene dioxide and monomer esters, polymeric esters can also be epoxidized by the peracid method as described in Australian Patent 11,862, issued in 1955. Examples of these unsaturated polyesters are those made from unsaturated polyhydric alcohols and unsaturated poly-basic acids, for example, maleic acid, 2-butenedioic acid, 4-cycolhexane-1,2-dicarboxylic acid, dimerized linoleic acid, etc., and such alcohols as ethylene glycol, 1,6-hexanediol, 3-ethylhexanediol-1,3-pentaerythritol, etc. Other polyesters which can be epoxidized with peracetic or other peracids are made from saturated acids and unsaturated alcholos, for example, 2-butenediol-1,4; 1,5-hexanediene-3,4-diol; 2-pentane-1,5-diol, cyclohexanediol-2,5, etc., reacted with such saturated acids or acid anhydrides as malonic, succinic glutaric, terephthalic, etc.

Examples of such polyepoxides include diglycidyl ether, the diglycidyl ether of diethylene glycol or dipropylene glycol, the diglycidyl ether of polypropylene glycols having molecular weights up to, for example, about 2000, the triglycidyl ether of glycerine, bisphenolic epoxies, the diglycidyl ether of resorcinol, epoxy novolacs, glycidyl ethers of Cashew nut oil, epoxidized soybean oil, epoxidized unsaturated polyesters, vinyl cyclohexene dioxide, dicyclopentadiene dioxide, dipentene dioxide, epoxidized polybutadiene and epoxidized aldehyde condensates such as 3,4-epoxy-6-methylcyclohexylmethyl-3,4-epoxy-6-methylcyclohexane carboxylate (Unox 201).

Commercial epoxy resins employed in the examples of the present invention were DER 332 diglycidyl ether of Bisphenol A; DER661 epoxy resin (a solid epoxy resin having an epoxide equivalent weight of 475 to 575); Epon 812 (a product having an epoxide equivalent weight of 140–165, an average molecular weight of 300 and a viscosiyt at 25° C. of 150–210 cps.); the diglycidyl ether of a polypropylene glycol having an average molecular weight of about 400 and an epoxide equivalent weight of about 355 (herein designated as Epoxy 355); 3,4-epoxy-6 - methylcyclohexylmethyl - 3,4 - epoxy - 6 - methylcyclohexane carboxylate (Unox 201); Oxirane 2001 (a product having an epoxide equivalent weight of 145 and an iodine number of 154); Epoxol 7-4 (an epoxidized soybean oil having an epoxide equivalent weight of 240 with an average of 4 epoxide groups per molecule); Cardolite NC 513 (an epoxidized Cashew nut oil having an epoxide equivalent weight of 475–575); DEN438 epoxy novolac having a molecular weight of 600 and an epoxide equivalent weight of 176; and X2633.8 epoxidized Bisphenol A having an epoxide equivalent weight of 298.

Monoepoxides which are preferred include polyfunctional compounds which have a reactive group such as —C=C—, OH or acetate in addition to the epoxide group. Examples of such compounds are 2,3-epoxy-2-ethyl hexanol; allyl-9,10-epoxystearate; and 3,4-epoxy-6-methylcyclohexylmethyl acetate. Simple monoepoxides such as styrene oxide and the alkylene oxides are also operative, although the degree of cross-linking obtained in the thermosetting reaction is generally lower and volatility may be a problem in some applications as with certain low molecular weight polyepoxies. In general when these monoepoxies are used the α,β-unsaturated dicarboxylic anhydride should be less than 100% mono-esterified because of the higher cross-linking efficiency of the anhydride groups.

Curing catalysts such as tertiary amines or amine salts, quaternary amine bases or salts, or inorganic bases may be used, if desired, to shorten the curing time.

The compositions of the present invention may include other additives such as plasticizers, fillers, pigments and the like. If desired, reactive agents such as epoxy, hydroxy, carboxy, anhydride, and mercapto-containing agents may be employed to obtain desired effects. Examples of such agents include polyesters made from phthalic or adipic acid and ethylene glycol or glycerine; anhydrides such as dodecyl succinic anhydride and trimellitic anhydride, fatty acid mono- or diglycerides; and liquid mercaptan terminated polysulfide polymers. Nonreactive plasticizers and additives such as n-butyl stearate, dioctyl diphenyl oxide, tris butyl phenyl phosphate; glass, cellulosic or synthetic fibers; metal filings, pigments, and inorganic fillers may be added as desired.

Coating and laminating applications normally employ organic solvent solutions of the copolymer-epoxy compositions. The solvent or solvent blend employed is chosen to provide the desired volatility, viscosity, rheology, sprayability or other properties. Solvents which are suitable include aromatic hydrocarbons such as toluene and xylene, ketones, such as methyl ethyl ketone, methyl isobutyl ketone, diacetone alcohol, and mesitylene oxide, high solvency naphthas, mineral spirits and alcohols, although mineral spirits usually have to be used in admixture with another solvent. When alcohols are employed their reactivity with anhydride which may remain in polymer and the possibility of transesterification with the glycol mono ether half ester must be considered.

Inasmuch as aromatic hydrocarbons provide the most economic solvents for the resins of this invention, a particular advantage is gained by using less than 20 mole percent of maleic anhydride partial ester in the vinyl copolymer. With greater amounts than this, solvent blends are usually required to dissolve the resin and higher viscosity solutions generally result. In addition, at higher maleic content the amount of epoxy resin required to react with the carboxyl groups becomes greater and can lead to overcrosslinking as well as economic disadvantages.

The epoxy used to cure or thermostat the vinyl copolymer resin also imparts improved adhesion to a substrate such as glass, metal, wood, etc. This allows even very hard thermoset compositions to exhibit good impact resistance and flexibility in that although crazing may occur, a coating, for example, will still adhere. Flexibility may be increased by using acrylates in a terpolymer as noted above, by incorporating plasticizing additives or by choosing a flexible type epoxy or a mixture thereof with a harder type epoxy.

The thermosetting composition may be cured over the temperature range of from about 20° C. up to about 400° C. At room temperature, the cure may require several months, although catalysts can shorten this to a few days. At elevated temperatures such as exposure to a flame, the cure may be accomplished in less than a minute. Preferred baking temperatures are generally 100 to 200° C. for times of 2 hours to about 10 minutes. The main test of cure is the performance of the cured composition. For example, in coatings optimum hardness, adhesion, solvent resistance, and impact resistance are gained only with adequate cure, which means in general reaction of epoxy groups with carboxyl groups.

The following examples will further illustrate the present invention but are not to be construed as limiting.

Example 1

Equimolar amounts of maleic anhydride and the listed alkylene oxide ether alcohols were reacted at about 60° C. until a constant refractive index was obtained. The half acid maleates which formed were all oily liquids of a light yellow to orange or amber color. They were soluble in acetone, 95% ethyl alcohol, xylene, and 1% NaOH and were insoluble in kerosene. In the table the column headed Acid Maleate Eq. Wt. represents the acid maleate molecular weight calculated from the experimentally determined hydroxyl content of the alcohol.

| Ether alcohol | Acid maleate eq. weight | Water Solubility | $n_D$ 25° C. | Absolute viscosity at 25° C. in cps. |
|---|---|---|---|---|
| Ethylene glycol methyl ether | 182.3 | Sol | 1.4666 | 123 |
| Ethylene glycol ethyl ether | 192.3 | Sol | 1.4620 | 102 |
| Ethylene glycol n-butyl ether | 224.1 | Insol | 1.4604 | 87.6 |
| Diethylene glycol methyl ether | 240.1 | Sol | 1.4687 | 191 |
| Diethylene glycol ethyl ether | 251.1 | Sol | 1.4657 | 171 |
| Diethylene glycol n-butyl ether | 267.7 | Insol | 1.4615 | 106 |
| Propylene glycol methyl ether | 187.7 | Sol | 1.4614 | 203 |
| Dipropylene glycol methyl ether | 250.1 | Sol | 1.4593 | 222 |

Example 2

A 22 liter flask was fitted with an efficient stirrer and condenser, and nitrogen and monomer inlets, and a pump was provided for uniformly pumping monomer solution into the flask. The flask was charged with 2711.5 g. of styrene and 1968.5 g. of xylene. A mixture of 977.4 g. of the acid maleate of Dowanol EB ethylene glycol monobutyl ether, 474.7 g. of xylene, 14.9 g. of di - t-butyl peroxide and 14.9 g. of t - butyl hydroperoxide was prepared. After flushing the flask with nitrogen and heating the contents to 47° C., 270 g. of the monomer feed solution was pumped into the flask. Heating was continued to bring the contents of the flask to the reflux temperature of 140° C. A vigorous polymerization reaction commenced and the feed was again started so that 1080 g. would be uniformly pumped into the flask over 82 minutes. At the end of the feed time the conversion of monomer to polymer was found by devolatilization in vacuo at 140° C. for 1 hour to be 89%. Heating was continued 3½ hours at reflux. A sample of 719 g. of clear polymer solution was removed from the flask and after cooling to 80° C. a solution of 418 g. xylene, 626 g. methyl ethyl ketone (MEK) and 15 g. of benzoyl peroxide was added. Heating at 80° C. was continued for 19 hours. The product was found to contain 47.3% solids. The devolatizated copolymer was dissolved in MEK at 10% solids and this solution at 25° C. had a viscosity of 1.62 cps. Infrared analysis of a cast film indicated that the maleic anhydride was about 65 mole percent in the form of the acid maleate.

About 4 months after preparation of the sample infrared indicated about 85 mole percent of the maleic anhydride was the acid maleate. This sample (20 g. of solution) was admixed with several epoxide-containing materials as follows to provide an epoxide to anhydride+COOH ratio of 0.85:

| Run | Epoxy resin | Eq. wt. | Wt. taken/20 grams |
|---|---|---|---|
| 1 | DER 332 | 174 | 1.90 |
| 2 | DER 661 | 525 | 5.75 |
| 3 | DEN 438 | 176 | 1.93 |
| 4 | Oxirane 2001 | 145 | 1.59 |
| 5 | Unox 201 | 140 | 1.53 |
| 6 | Epon 812 | 150 | 1.64 |
| 7 | Epoxy 355 | 355 | 3.89 |
| 8 | Epoxol 7-4 | 240 | 2.63 |
| 9 | Allyl-9,10 epoxy stearate | 338 | 3.71 |
| 10 | 2,3-Epoxy-2-ethylhexanol | 144 | 1.58 |
| 11 | 3,4-Epoxy-6-methylcyclohexyl-methyl acetate | 814 | 2.02 |
| 12 | Styrene oxide | 121 | 1.33 |

Added 10 g. MEK and 0.3% Arquad 12 (n - dodecyl ammonium chloride, 50% in isopropanol) based on solids to each sample and cast in aluminum dishes. After drying overnight the films were baked at 150° C. for 1 hour. The compatibility, cure, and hardness of all the films were excellent.

Example 3

In a manner similar to that of Example 2 the following copolymers with styrene were prepared:

| Sample No. | Alcohol | Mole Percent A.M. | Wt. Percent A.M. | Visc. | Percent solids | Percent conversion |
|---|---|---|---|---|---|---|
| 1 | Dowanol DBM di-butylene glycol monomethyl ether | 13 | 28.2 | 1.28 | 37.7 | 94.2 |
| 2 | Dowanol DPM dipropylene glycol monomethyl ether | 13.2 | 35.2 | 1.46 | 54.2 | 92.0 |
| 3 | Ethylene glycol phenyl ether | 13.2 | 25.7 | 1.38 | 60.0 | 100 |

These were formulated with DER332 epoxy resin in the indicated epoxide to anhydride plus COOH ratio diluted with solvent, cast on tin plate test panels, baked at 150° C. for 60 minutes and tested. All gave clear, transparent coatings having excellent mar resistance, good impact strength and good resistance to crazing.

| Sample | Epoxy/COOH | Catalyst [1] | Thickness, mils |
|---|---|---|---|
| 1 | 1.0 | DMP 30 | 1.3 |
| 2 | 2.0 | None | 1.6 |
|   | 1.67 | do | 1.7 |
|   | 1.43 | do | 1.8 |
|   | 1.0 | do | 1.6 |
| 3 | 1.0 | DMP 30 | 1.8 |

[1] Catalyst used at 0.3% by weight of polymer solids. DMP 30 is tri(dimethylaminoethyl) phenol.

Example 4

Samples of clear, transparent styrene-maleic anhydride copolymers containing the indicated mole percent of maleic anhydride were reacted with Dowanol DB diethylene glycol mono - n - butyl ether in the amounts as shown:

| Run | Mole Percent | MEK [1] Visc. | Wt. polymer | Wt. xylene | Wt. MIBK [2] | Wt. Dowanol DB |
|---|---|---|---|---|---|---|
| 1 | 4.1 | 6.9 | 250 | 241 | [3] 26 | 16.9 |
| 2 | 7.2 | 5.3 | 100 | 167 | --- | 11.2 |
| 3 | 11.7 | 3.8 | 100 | 180 | --- | 19.7 |
| 4 | 15.0 | 3.5 | 100 | 186 | --- | 24.4 |
| 5 | 20.0 | 4.2 | 100 | 202 | 10 | 34.3 |
| 6 | 23.1 | 4.1 | 100 | 207 | 32 | 38.1 |
| 7 | 28.2 | 4.4 | 100 | 110 | 110 | 46.5 |

[1] MEK=methyl ethyl ketone.
[2] MIBK=methyl isobutyl ketone.
[3] MEK also added 0.5 g. toluene sulfonic acid catalyst.

The sample in Run 1 was reacted 6 hours at 110° C. This gave a product which was about 55 mole percent half ester.

Samples 2–7 inclusive were heated at 130° C. for 20 hours followed by 80° C. for 6 days. One percent p - toluene sulfonic acid was added and heating at 60° C. was continued for 16 hours followed by 16 days at room temperature. These products were about 90 to 95 mole percent half ester.

Formulated enamels from 5 g. of the polymer solids with DER332 epoxy resin or Cardolite NC513 epoxy resin as shown. Films having a thickness of 0.9 to 1.3 were cast. The films had good color, clarity, craze, mar and solvent resistance (xylene). They passed reverse impact tests of up to 90 in.-lbs.

| Sample from run | Epoxy resin | COOH/epoxy | Grams epoxy |
|---|---|---|---|
| 1 | DER 332 | 1.43 | 0.458 |
| 2 | DER 332 | 1.43 | 0.730 |
| 3 | DER 332 | 1.43 | 1.18 |
| 4 | DER 332 | 1.43 | 1.43 |
| 5 | DER 332 | 1.43 | 1.85 |
| 6 | DER 332 | 1.43 | 2.02 |
| 7 | DER 332 | 2.0 | 3.24 |
| 1 | Cardolite NC 513 | 1.0 | 1.00 |
| 2 | do | 1.0 | 1.60 |
| 2 | do | 2.0 | 3.20 |
| 2 | do | 0.5 | 0.80 |
| 3 | do | 1.0 | 2.58 |
| 4 | do | 1.0 | 3.13 |
| 5 | do | 1.0 | 4.04 |
| 6 | do | 1.0 | 4.38 |
| 7 | do | 1.0 | 5.07 |
| 7 | do | 2.0 | 10.14 |
| 7 | do | 0.5 | 2.54 |

Example 5

In a manner similar to that of Example 4, 100 gram samples of a copolymer of styrene and maleic anhydride containing 14.2 weight percent of maleic anhydride and having a solution viscosity of 3.49 centipoises were reacted with the indicated alcohols in the amount shown in a solvent consisting of 80 grams xylene and 20 grams MEK:

| Run | Percent toluene sulfonic acid | Alcohol | G. alcohol |
|---|---|---|---|
| 1 | 1 | AOE [1] | 14.8 |
| 2 | 1 | ADEE [2] | 21.2 |
| 3 [3] | None | Dowanol EB, butyl ether. | 16.5 |

[1] 2-allyl oxyethanol.
[2] 2-allyloxyethoxy-2-ethanol.
[3] Vinyl toluene/MA copolymer 12.8% weight percent MA, 2.03 cps.

Sample 1 was heated at 130° C. for 21 hours followed by 80° C. for 96 hours. The infrared analysis indicated about 60 mole percent monoester. Samples 2 and 3 were reacted at room temperature for 3 months until the infrared spectrum indicated about 90 mole percent reaction to half ester. Five gram samples of the resulting polymer solids were formulated with 0.3% DMP30 and DER332 epoxy resin in an epoxy to anhydride+COOH ratio of 1:1.

Thin films were then cast on tin plate and baked at 150° C. for 60 minutes. The resulting coatings had excellent color and clarity. They were highly resistant to crazing (¼″ mandrel bend) and did not swell, peel or mar in xylene. They passed reverse impact tests of up to 90 in.-lbs.

Example 6

In a manner similar to that of Example 5, 100 parts of a copolymer containing 75 weight percent dichlorostyrene and 25 weight percent Dowanol EB (butyl ether of ethylene glycol) (100% esterified) with about 20 parts DER332 epoxy resin and 0.5 part of DMP30 is dissolved in MEK to 40% solids. Glass cloth (weave 181 with Volan A finish) is saturated with the above solution by continuous dipping and air dried for 24 hours. Twelve plys of the impregnated cloth are stacked and placed in a flat press at 300° C. After a few seconds at about 50 p.s.i. the pressure is raised to 300 p.s.i. for about 30 minutes. The laminate is removed from the press and cooled. It is hard, stiff and structurally sound.

Example 7

Following the procedure of Example 2 copolymers of vinyltoluene with n - butyl acid maleate and dipropylene glycol methyl ether (DPM) were prepared having the following characteristics.

| Run | Alcohol | Mole percent acid maleate | Wt. percent acid maleate | Viscosity [1] | Percent solids |
|---|---|---|---|---|---|
| 1 | Butanol | 13.0 | 17.9 | 1.43 | 37.7 |
| 2 | DPM | 13.0 | 23.8 | 2.47 | 37.0 |

[1] Viscosity at 25° C., 10% in MEK.

A mixture of 6.0 grams of the polymer from Run 2, 4.18 grams of the polymer from Run 1 (50/50 mole ratio) and 2.49 grams DER332 epoxy resin (1.43 epoxy/COOH ratio) was prepared and cast on tin plate. After baking for 75 minutes at 150° C., the 1.2 mil film passed a reverse impact test of 30 in.-lbs. and had excellent resistance to mar and 1% Tide solution at 60° C. for 120 hours.

Example 8

The monoester of 2 - methoxy - 2 - methyl pentanol-4 and maleic acid was prepared as in Example 1 and copolymerized with styrene following the procedure of Example 2 to prepare a clear copolymer containing 13.2 mole percent of the acid maleate and having a solution viscosity, 10% in MEK at 25° C., of 1.36. The polymer was formulated with DER332 epoxy resin at a 1:1 epoxy/COOH ratio and 0.3 weight percent DMP30. A film was cast on tin plate and baked at 150° C. for 1 hour. The resulting coating (1.5 mils) was clear and compatible. It had excellent resistance to xylene and marring.

Example 9

Employing the method of Example 2 a copolymer of 25 weight percent Dowanol EB butyl ether half ester of maleic acid and 75 weight percent styrene was prepared using a 25 mole percent excess of Dowanol EB butyl ether. The polymerized solution was diluted to 50% solids with xylene, giving a solvent blend of 96/4 xylene/Dowanol EB butyl ether.

A white appliance enamel was prepared by grinding the following mixture on a ball mill for 16 hours to a Hegman grind of 7:

|  | G. |
|---|---|
| Above resin solution | 350 |
| TiO$_2$ | 350 |
| Xylene | 105 |
| Dowanol EB butyl ether | 70 |

This pigment slip was let down with 228 grams of the resin solution, 61 grams DER332 epoxy resin, 62 grams xylene and 44 grams Dowanol EB butyl ether. The final enamel had a pigment to binder ratio of 1:1, and was 55% solids with a solvent ratio of 78:22 xylene/Dowanol EB butyl ether. The No. 4 Ford cup viscosity was 56 seconds. At this point 0.875 gram of DMP30 catalyst was added and coatings on unpolished Bonderite 1000 (Parker Rust Proof Co.) were cast with a Maier Rod to give dry film thickness of 1.3–1.5 mils. After flash drying the panels were baked at 350° F. for 30 minutes.

The resulting film passed a reverse impact test of 20 in.-lbs. It had good resistance to crazing on ½" mandrel bend, excellent gloss, excellent resistance to staining by mustard and lipstick, and excellent resistance to xylene and 1% Tide solution at 60° C. for 192 hours.

Example 10

Tin can stock was coated with a thermosetting composition as in Run 1 of Example 2. In achieving drawdown with a Maier wire-wound rod to about 0.3 mil final film thickness, the flow and wetting characteristics of the coating were observed to be very good. After baking at 400° F. for 10 minutes, the coating was found to be hard and well bonded to the metal. The coated metal was tested in canned cherries with no visible staining or corrosion and the adhesion was retained.

To illustrate the non-homogeneity and lack of utility of the generally 1:1 type products of the prior art the following examples were run:

Example 11

Following the procedure of Hicks U.S. Patent 2,934,516 a charge of:

|  | Moles |
|---|---|
| Maleic anhydride | 3 |
| Propylene glycol methyl ether | 3 | was heated at 120° C. for one hour to prepare the half-ester after which a mixture of:

7 grams of the above half-ester 18 grams of D.E.R.® 660 (Epoxy resin with an epoxy equivalent weight of 425–475)

25 grams styrene 0.25 gram benzoyl peroxide paste (50% solution in tricresyl phosphate and 0.25 gram benzyl trimethylammonium chloride (added as a 60% solution in H$_2$O)

was prepared by melting the epoxy resin in the styrene with the heat from an infrared bulb, cooling to about 50° C. and adding the half-ester after which the benzoyl peroxide and benzyl trimethyl ammonium chloride were added. 9.99 grams of this resulting mixture was poured into an open dish and heated at 100° C. until gelation occurred (three hours), and then cured at 150° C. for 3 hours. The product weight was 7.10 grams, i.e. the loss in weight was 2.89 grams or 28.9%.

Example 12

(A) A second sample was prepared as above except that it was cured in a closed bottle for 3 hours at 100° C. and then three hours at 150° C.

(B) For contrast, another sample was prepared in accordance with the present invention as follows:

A mixture of 78.1 weight percent styrene and 21.9 weight percent propylene glycol methyl ether acid maleate (as prepared in Experiment I) was reacted at reflux (135–145° C.) in xylene solution in the presence of 0.375 weight percent each of ditertiary butyl peroxide and tertiary butyl hydroperoxide as catalyst by feeding the half-ester plus catalyst in solution over a period of 90 minutes in approximately equal increments. The total reaction time was 4 hours. Conversion was 95+percent. This product was separated from the polymerization solvent by vacuum stripping for 90 minutes at 140° C. and 2–5 mm. vacuum. Then 64 grams of this polymer; 36 grams DER660 epoxy resin; and 42 grams of a 60% solution of benzyltrimethylammonium chloride in water were dissolved in 100 grams of methyl ethyl ketone. The product was cured for 3 hours at 100° C. during which time the solvent volatilized and then 3 hours at 150° C.

Samples of products A and B were then individually extracted with methyl ethyl ketone and xylene in Soxhlet extractors for 12 hours with the following results:

Xylene extraction:

|  | Percent |
|---|---|
| (A) Wt. loss | 10.075 |
| (B) Wt. loss | 3.383 |

Methyl ethyl ketone extraction:

|  |  |
|---|---|
| (A) Wt. loss | 26.02 |
| (B) Wt. loss | 3.64 |

Other samples of products A and B were cast on tin test panels and cured for 5 minutes at room temperature and 30 minutes at 175° C. The resulting cured films had a thickness of 2 mils.

(A) Passed 1 inch-lb. front impact and failed 2 inch-lb. front impact.

(B) Passed 8 inch-lb. front impact.

Still other cast films (2 mil thickness) were placed in xylene for one-half hour. After this time, Film A was removed by peeling with fingernail. Film B could not be removed in this manner. Cured Films A were pock marked and uneven in thickness. Cured Films B were smooth and uniform.

The high solubles of the Hicks product and the susceptibility of the Hicks film to softening by xylene confirm the presence of significant proportions of styrene homopolymer and attests to the non-homogeneity of such prior art products.

What is claimed is:

1. A compatible thermosetting resin composition dissolved in an organic solvent therefore, said composition consisting essentially of at least 50% by weight of (A)

a homogeneous copolymer consisting essentially of from 80 to 96 mole percent of a monoalkenyl aromatic compound and from 20 to 4 mole percent of a partial ester of an α,β-unsaturated dicarboxylic acid, wherein at least 90 percent of the copolymer has an anhydride component composition within a range of 5 percent, which is esterified from 50 to 120 mole percent with an alkylene oxide mono ether alcohol having the formula $$R(OC_nH_{2n})_mOH$$

wherein $n$ is an integer from 2 to 6 inclusive, $m$ is an integer from 1 to 2 and R is a member of the group consisting of primary and secondary alkyl, cycloalkyl and benzenoid aromatic radicals containing from 1 to 8 carbon atoms in the alkyl groups and $C_3$ to $C_8$ unsaturated aliphatic primary and secondary alcohols wherein the —C=C— group is at least one carbon removed from the OH group, and up to 50% by weight (B) a 1,2-polyepoxide having an epoxy equivalent weight of from about 110 to about 700, the ratio of said 1,2-polyepoxide to said partial ester being from 0.2 to 2.5.

2. Composition of claim 1 wherein the α,β-unsaturated dicarboxylic acid is maleic acid.

3. Composition of claim 2 wherein the acid is esterified with ethylene glycol monobutyl ether.

4. Composition of claim 3 wherein the monoalkenyl aromatic compound is styrene.

5. Composition of claim 4 wherein the 1,2-polyepoxy compound is the diglycidyl ether of Bisphenol A.

6. An article having on at least one surface a thin, tough, continuous and adherent protective baked-on coating consisting essentially of the composition of claim 1.

7. A laminate structure comprising at least two layers joined together by, and integrally bound with, a tough, adherent, cured adhesive consisting essentially of the composition of claim 1.

8. Method of preparing compositions of claim 1 comprising (1) mono-esterifying a homogeneous styrene-maleic anhydride copolymer to from 50 to 120 percent with an alkylene oxide mono ether alcohol having the formula $$R(OC_nH_{2n})_mOH$$

wherein $n$ is an integer from 2 to 6 inclusive, $m$ is an integer from 1 to 2 and R is a member of the group consisting of primary and secondary alkyl, cycloalkyl and benzenoid aromatic alcohols containing from 1 to 8 carbon atoms in the alkyl groups and $C_3$ to $C_8$ unsaturated aliphatic primary and secondary alcohols wherein the —C=C— group is at least one carbon removed from the OH group and (2) blending the partially esterified copolymer into an intimate admixture with a 1,2-polyepoxide having an epoxy equivalent weight of from about 110 to about 700.

References Cited
UNITED STATES PATENTS

| | | | |
|---|---|---|---|
| 2,769,804 | 11/1956 | Hanson | 260—86.7 |
| 2,934,516 | 4/1960 | Hicks | 260—837 |
| 2,949,438 | 8/1960 | Hicks | 260—837 |
| 3,207,718 | 9/1965 | Zimmerman et al. | 260—837 |
| 3,247,288 | 4/1966 | Masters et al. | 260—837 |
| 3,278,469 | 10/1966 | Pascale | 260—23 |

GEORGE F. LESMES, *Primary Examiner.*